April 4, 1967 J. D. GREENSTREET 3,312,480
THREE WHEEL TRAILER WITH CASTER-WHEEL CONTROLLED GUIDE
Filed Oct. 18, 1965
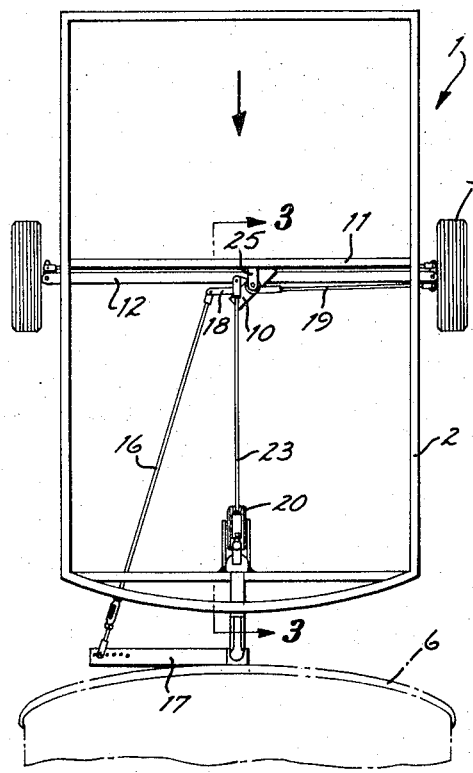
FIG. 1
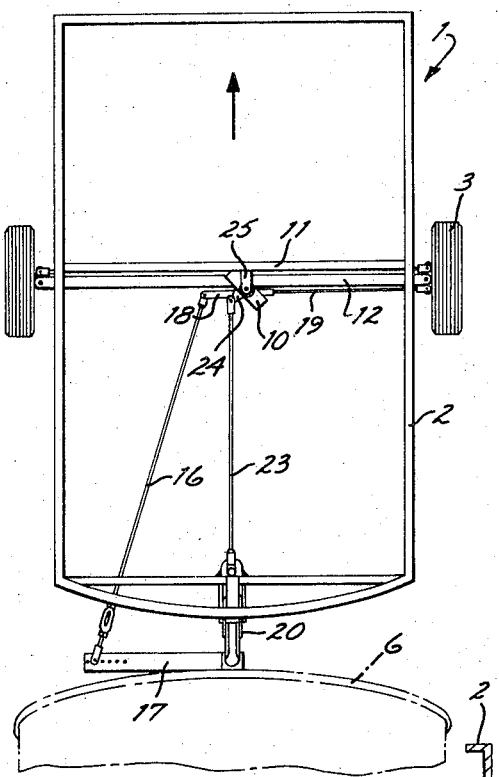
FIG. 2
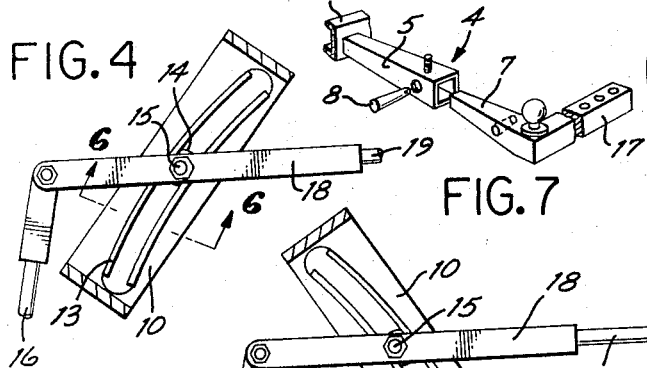
FIG. 3
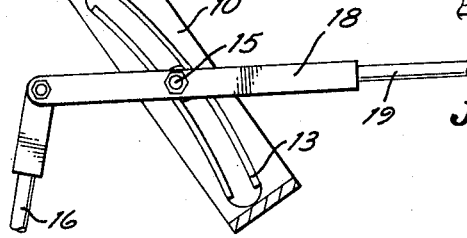
FIG. 4 FIG. 7
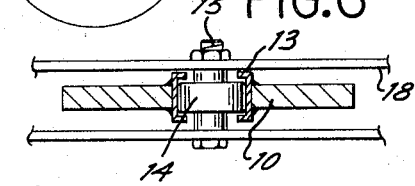
FIG. 6
FIG. 5
INVENTOR.
JACK D. GREENSTREET
BY
ATTORNEY United States Patent Office 3,312,480
Patented Apr. 4, 1967

3,312,480
THREE WHEEL TRAILER WITH CASTER-
WHEEL CONTROLLED GUIDE
Jack D. Greenstreet, 2150 Earl Ave.,
Long Beach, Calif. 90806
Filed Oct. 18, 1965, Ser. No. 496,870
5 Claims. (Cl. 280—443)

This invention relates to a trailer guide and steering mechanism for a trailer whereby the trailer is caused to track directly into the path of the pulling vehicle in both the forward and the reverse direction of movement of the vehicles.

An object of my invention is to provide a novel means of steering the wheels of a trailer when pulled by a vehicle, whereby on forward movement of the pulling vehicle the steering of the trailer wheels is controlled by a cam in one position, and on rearward movement of the pulling vehicle the cam is reversed in its position on the trailer by means of a caster wheel.

Another object of my invention resides in the novel mechanical means of shifting the position of the cam plate during movement of the trailer either in a forward or a rearward direction.

Still another object of my invention is to provide a trailer guide which will properly steer the wheels of the trailer during both forward and rearward movement of the pulling vehicle, the steering being controlled by a caster wheel which is swivelly mounted on the frame of the trailer.

Another object is to provide a novel means of steering the wheels of a trailer by means of a caster wheel mounted on the frame of the trailer, whereby on forward movement of the pulling vehicle the caster wheel will trail in one direction and position a cam plate accurately, and to reverse the position of the caster wheel and the cam plate controlled thereby when the pulling vehicle reverses its direction of movement to cause the trailer to accurately track with the pulling vehicle.

Other objects, advantages and features of invention may appear from the accompanying drawing, the subjoined detailed description and the appended claims.

In the drawing:

FIGURE 1 is a plan view of my trailer guide mounted on a trailer and with the parts positioned for forward movement of the pulling vehicle.

FIGURE 2 is a view similar to FIGURE 1 but with the parts positioned during the rearward movement of the vehicle and trailer.

FIGURE 3 is a sectional view taken on line 3—3 of FIGURE 1.

FIGURE 4 is a sectional view taken on line 4—4 of FIGURE 3 and showing the cam plate during the forward movement of the vehicle.

FIGURE 5 is a view similar to FIGURE 6 but showing the cam plate during the rearward movement of the vehicle.

FIGURE 6 is a sectional view taken on line 6—6 of FIGURE 4.

FIGURE 7 is a perspective view of a coupling structure between the trailer and the pulling vehicle.

Referring more particularly to the drawing, the trailer 1 consists of a frame 2 on which the steerable or pivotally mounted wheels 3 are suspended. These wheels are pivotally mounted on the usual spindles, all of which is usual and well known in the art. The trailer is pulled by means of the drawbar mechanism, shown at 4 in FIGURE 7. This drawbar mechanism consists of a sleeve 5 which is fixedly attached to the bumper 6 of the pulling vehicle. The sleeve 5 receives a tapered bar 7 which is held in position by a pin 8; thus a quick connect and disconnect device is provided. The frame 2 may also be attached to the pulling vehicle by means of a solid strap, if desired.

A cam plate 10 is pivotally attached to a cross member 11 on the frame 2. This cross member 11 is substantially in the same vertical plane or adjacent to that plane of the wheel axle 12 of the trailer 1. The cam plate 10 is formed with an arcuate cam slot 13 and a roller 14 fits in the cam slot, and the roller is mounted on a vertical pin 15.

A rod 16 is attached at one end to a horizontal arm 17, which arm is fixedly attached to the rear of the pulling vehicle, or may be an integral part of the mounting bar 7. The arm 17 is fixed relative to the pulling vehicle and, consequently, will move arcuately in a horizontal plane as the pulling vehicle turns from side to side. The arm 17 may have several mounting holes therein to permit adjustment of the position of the rod 16. A clevis 18 is pivotally mounted at its center on the pin 15 and one end thereof is pivotally attached to the outer end of the rod 16. A steering rod 19 extends from the other end of the clevis 18 to the usual steering arm of the wheels 3, so that the trailer wheels are thus steered as the arm 19 moves back and forth in a horizontal plane.

A caster wheel 20 is swivelly mounted at the forward end of the trailer frame 2, and a steering plate 21 is fixedly attached to the pivot 22 of the caster wheel. One end of a shift rod 23 is pivotally attached to the shift plate 21 and the other end of this shift rod is pivotally secured to a projecting arm 24 on the cam 10. Since the cam plate 10 is pivotally mounted on a lug 25 on the cross member 11, it will be evident that longitudinal movement of the shifting rod 23 will cause the cam plate 10 to rotate through an angle of approximately 90°, more or less. Thus the angle of the cam slot 13 is changed from the position shown in FIGURE 4, which is the forward direction of the vehicle, to the position shown in FIGURE 5 which is the rearward direction of the vehicle. In the reverse direction of the vehicle the wheels 3 are moved in an opposite direction to that in which they move when the vehicle is moving in a forward direction. This is necessary to cause the trailer to accurately track the wheels of the pulling vehicle.

*In operation*

Assuming first that the vehicle is moving forwardly, as shown in FIGURE 1, and the caster wheel 20 is then trailing in the position shown in FIGURE 3. The cam plate 10 is now fixedly held against any rotative movement by the shifting rod 23. As the pulling vehicle turns to the left or right, it will cause the horizontal arm 17 to swing in an arc, which will cause a pushing or pulling movement by the rod 16, and will thus move the roller 14 back and forth in the cam slot 13. The shape of the cam slot 13 will cause a pushing and pulling movement of the steering rod 19, and will thus steer the trailer wheels 3 in the same direction as the direction of movement of the pulling vehicle.

If the pulling vehicle reverses its movement, then the caster wheel 20 will move through 180°, causing a pull on the shift rod 23 and will then move the cam plate 10 through an angle of about 90°, more or less, and to the position shown in FIGURE 5. Steering movement of the pulling vehicle will again move the horizontal arm 17 as previously described, but in this instance the cam 13 is positioned at a different angle than when the pulling vehicle is moving forwardly and, consequently, the wheels 3 of the trailer will move at an opposite angle to the position of the steering wheels of the pulling vehicle. Thus when the trailer is in reverse movement, the wheels 3 will move in an opposite direction to the steering wheels of the pulling vehicle. When the pulling vehicle again moves in a forward direction, the caster wheel 20 immediately assumes the position shown in FIGURE 1, and the cam plate 10 is returned to the position shown in FIGURE 4, and the trailer will be caused to track the pulling vehicle in the manner first described above.

Having described my invention, I claim:

1. A trailer guide for a trailer having steerable wheels thereon, comprising a cam plate, means pivotally mounting the cam plate on the trailer, said plate having a cam slot therein, a pin extending through the cam plate and movable in said cam slot, a horizontal arm fixedly mounted on the pulling vehicle, a rod extending from the pin to the horizontal arm, a caster wheel journaled on the trailer, a shift rod extending from the caster wheel to the cam plate to partly rotate the cam plate on its pivot, and a steering rod extending from said pin to a steerable wheel on the trailer.

2. A trailer guide as recited in claim 1, and where the cam plate is partly rotated through approximately 90°, more or less, by movement of said shift rod.

3. A trailer guide as recited in claim 1, and where the caster wheel is mounted adjacent the forward end of the trailer, said caster wheel including a fixed shift plate thereon, said shift rod being pivotally attached at one end to the shift plate and at the other end to said cam plate.

4. A trailer guide as recited in claim 1, and where the cam plate is partly rotated through approximately 90°, more or less, by movement of said shift rod, and where the caster wheel is mounted adjacent the forward end of the trailer, said caster wheel including a fixed shift plate thereon, said shift rod being pivotally attached at one end to the shift plate and at the other end to said cam plate.

5. A trailer guide as recited in claim 1, and a clevis spanning the cam plate, said pin being pivotally attached to the clevis, one end of said rod being pivotally secured to one end of the clevis and the other end of the clevis being attached to one end of the steering rod.

References Cited by the Examiner

UNITED STATES PATENTS

| | | | |
|---|---|---|---|
| 2,513,931 | 7/1950 | Greenstreet | 280—443 |
| 2,579,118 | 12/1951 | Land | 280—443 |
| 2,643,892 | 6/1953 | Fletcher et al. | 280—445 X |

LEO FRIAGLIA, *Primary Examiner.*